US012064903B2

(12) United States Patent
Garn et al.

(10) Patent No.: US 12,064,903 B2
(45) Date of Patent: Aug. 20, 2024

(54) PROCESS FOR MANUFACTURING A TREAD MOLDING ELEMENT CONFIGURED TO MOLD AT LEAST A PORTION OF A TIRE TREAD (71) Applicant: THE GOODYEAR TIRE & RUBBER COMPANY, Akron, OH (US)

(72) Inventors: Benjamin Isaiah Garn, Norton, OH (US); Marc Borowczak, Hartville, OH (US); Jimmy Lee Richards, Rootstown, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 110 days.

(21) Appl. No.: 17/649,201

(22) Filed: Jan. 28, 2022

(65) Prior Publication Data
US 2022/0305698 A1 Sep. 29, 2022

Related U.S. Application Data (60) Provisional application No. 63/166,375, filed on Mar. 26, 2021.

(51) Int. Cl.
B29C 33/38 (2006.01)
B29C 64/118 (2017.01)
(Continued)

(52) U.S. Cl.
CPC ........ *B29C 33/3842* (2013.01); *B29C 64/118* (2017.08); *B29C 71/02* (2013.01);
(Continued)

(58) Field of Classification Search
CPC .............. B29C 33/3842; B29C 64/153; B29C 2071/022; B29C 71/00–02;
(Continued)

(56) References Cited

U.S. PATENT DOCUMENTS 9,833,986 B1 12/2017 Susnjara
2014/0265033 A1 9/2014 Woloszyn et al.
(Continued)

FOREIGN PATENT DOCUMENTS

CN 105082412 A 11/2015
CN 108638397 A 10/2018
(Continued)

OTHER PUBLICATIONS

English translation of DE-102016201063-A1 by EPO. (Year: 2017).*
(Continued)

*Primary Examiner* — Timothy Kennedy
*Assistant Examiner* — Inja Song
(74) *Attorney, Agent, or Firm* — Katherine A. Smith (57) ABSTRACT The disclosure provides a process for manufacturing a tread molding element configured to mold at least a portion of a tire tread, the process comprising the steps of modeling a three-dimensional shape of a tread molding element through a modeling program that can be recognized by a 3D printer; providing one or more plastic compositions comprising one or more thermoplastic polymers having a melting point of at least 180° C.; forming a tread molding element by 3D printing from the one or more plastic compositions; and optionally annealing the tread molding element.

18 Claims, 2 Drawing Sheets (51) Int. Cl.
| | |
|---|---|
| *B29C 71/02* | (2006.01) |
| *B29D 30/06* | (2006.01) |
| *B29K 77/00* | (2006.01) |
| *B29K 307/04* | (2006.01) |
| *B29K 309/08* | (2006.01) |
| *B29L 31/00* | (2006.01) |
| *B33Y 10/00* | (2015.01) |
| *B33Y 40/20* | (2020.01) |
| *B33Y 80/00* | (2015.01) |

(52) U.S. Cl.
CPC ......... *B29D 30/0606* (2013.01); *B33Y 10/00* (2014.12); *B33Y 40/20* (2020.01); *B33Y 80/00* (2014.12); *B29C 2071/022* (2013.01); *B29K 2077/00* (2013.01); *B29K 2307/04* (2013.01); *B29K 2309/08* (2013.01); *B29L 2031/757* (2013.01)

(58) Field of Classification Search
CPC ... B29C 64/118; B29D 30/0606; B33Y 40/20; B33Y 10/00; B33Y 80/00; B29K 2077/00; B29K 2307/04; B29K 2309/08; B29L 2031/757
See application file for complete search history.

(56) References Cited

U.S. PATENT DOCUMENTS

| | | | |
|---|---|---|---|
| 2014/0277664 A1 | 9/2014 | Stump | |
| 2015/0145168 A1* | 5/2015 | Rodgers | B29C 64/118 264/308 |
| 2016/0009039 A1* | 1/2016 | Blanchet | B29D 30/0601 219/76.12 |
| 2017/0001340 A1* | 1/2017 | Koyanagi | B22F 7/06 |
| 2018/0009134 A1 | 1/2018 | Berben | |
| 2018/0319077 A1 | 11/2018 | Blanchet et al. | |
| 2018/0354191 A1* | 12/2018 | Nauka | B33Y 10/00 |
| 2021/0107216 A1 | 4/2021 | Chaffins et al. | |
| 2021/0138691 A1* | 5/2021 | Laurent | B33Y 10/00 |
| 2022/0010144 A1* | 1/2022 | Hotter | C08J 3/203 |
| 2022/0049089 A1 | 2/2022 | Geng et al. | |
| 2022/0212398 A1* | 7/2022 | Hammonds | B29C 64/118 |

FOREIGN PATENT DOCUMENTS

| | | |
|---|---|---|
| CN | 111958888 A | 11/2020 |
| DE | 102016201063 A1 * | 7/2017 |
| DE | 102016201063 A1 | 7/2017 |
| EP | 2399695 A1 | 12/2011 |

OTHER PUBLICATIONS

"Omnexus-PA" ("Polyamide or Nylon: Completed Guide," in public at least on Nov. 8, 2020, available at https://web.archive.org/web/20201108174345/https://omnexus.specialchem.com/selection-guide/polyamide-pa-nylon). (Year: 2020).*

"Omnexus-Tg" ("Glass Transition Temperature," in public at least on Jan. 20, 2021, available at https://web.archive.org/web/20210120073734/https://omnexus.specialchem.com/polymer-properties/properties/glass-transition-temperature). (Year: 2021).*

3D Printing Tips, Fused Filament Fabrication (FFF) material properties & considerations, 2015, https://web.archive.org/web/20150501000000*/http://www.powerspec.com/support/3DPrinters/3DPrintingTips.pdf, 5 pages, Wayback Machine.

Beaudoin et al., JMS-1704: Multihead 3D Printer, Worcester Polytechnic Institute, Dec. 16, 2016, pp. 1-52.

European Search Report for Serial No. EP22164565 dated Aug. 16, 2022.

Chinese Office Action for Application No. 202210308351.3, dated Mar. 6, 2024.

* cited by examiner

PROCESS FOR MANUFACTURING A TREAD MOLDING ELEMENT CONFIGURED TO MOLD AT LEAST A PORTION OF A TIRE TREAD

FIELD OF THE INVENTION

The disclosure relates to the manufacture of tire-related molds, and more specifically, to the manufacture of molds for molding a tire or tire tread. The disclosure relates to the manufacturing of mold segments, inserts with tread reverse imprint for mold segments, parts of mold segments and parts of inserts, in particular to ease prototyping of tires and/or to ease prototyping of tire treads.

BACKGROUND OF THE INVENTION

Pneumatic tires are manufactured according to relatively standardized processes and machinery. For example, a green tire, which is a tire in an uncured state, is inserted into a tire mold where it is cured and vulcanized. The tire mold is designed to shape the tire but also to mold the circumferential tread pattern and to add written information or branding on the sides of the tire.

At the time of tire molding, the tire mold is closed by moving circumferential mold segments inward in a tire radial direction. Each segment shows on its inner face a plurality of blades extending into the mold, mostly in the radial direction, and forms a reverse imprint arranged to cut the surface of the green tire according to the desired tread pattern, wherein a blade arranged to protrude from the inner face of the mold segment is cutting a groove or a sipe within the tread member of the tire. Then, the tire is subjected to vulcanizing.

When developing new tires there is a need to test different tread pattern designs to evaluate the performances of the resulting tire. The manufacturing of the associated mold is labor-intensive, time-consuming and expensive, so a solution is to be found to ease the production of mold segments or inserts for mold segments for testing purposes but also the production of tires in general.

Tire molds are typically made from metal or metal alloy materials, such as aluminum or steel, which can be cast or machined in a computer numerical control (CNC) machine to form the desired negative tread pattern. The mold segments or the tire mold tread inserts can also be made from additive manufacturing technology, the tire mold tread inserts are then coupled to tire mold supports. It is therefore known to produce mold segments and tire mold tread inserts wherein the inserts show a tread reverse imprint of a tread pattern by three-dimensional printing (3D-printing) of metal and metal alloys such as aluminum or steel. However, it was found desirable to further reduce the costs and the time associated with 3D-printing of metal and metal alloys.

EP2777922 describes a method and an apparatus for developing and forming a tire-related mold configured to at least mold a portion of a tire tread. The method includes creating a digital model representing a three-dimensional structure comprising a tread model molding member, the tread model molding member at least partially defining a molding cavity for forming a corresponding tire tread model. The three-dimensional structure comprising the tread model molding member is formed automatically using the digital model, the structure being formed by building the structure from one or more materials, the one or more materials including an elastic material such that the formed structure is elastic. A tread model is molded using the tread model molding member, while a tread molding element for forming at least a portion of a tread is molded from the tread model.

The method and apparatus described are interesting, but there is a need to further improve the balance between costs and ease of production of a tread molding element, in other words, to provide a process for manufacturing a tread molding element configured to mold at least a portion of a tire tread that is more efficient and cost-effective. There is also a need for a process that is simple and fast.

SUMMARY OF THE INVENTION

One or more of the above needs can be fulfilled by the present disclosure wherein a process of additive manufacturing such as 3D-printing, wherein reusable tread molding element that shows a reverse imprint of a tread pattern can be produced using a standard 3D-printer such as a Fused Filament Fabrication printer (i.e. FFF printer) with a plastic composition that withstands curing temperatures and pressures that are involved during the manufacture of the tire such as during the vulcanizing step. The present disclosure provides for a process that is simple, fast and cheap since the tread molding element is formed using 3D printing with thermoplastic polymers. The process is devoid of a curing step of the one or more plastic compositions wherein the curing step is performed by exposure to a light source, such as an ultraviolet light source. The process of the disclosure is devoid of a step of removing a filler material or of removing a coating layer before the tread molding element is used.

According to a first aspect, the disclosure provides for a process for manufacturing a tread molding element configured to mold at least a portion of a tire tread, the process comprising the steps of:

modeling a three-dimensional shape of a tread molding element through a modeling program;

providing one or more plastic compositions comprising one or more thermoplastic polymers having a melting point of at least 180° C. determined according to ISO 3146:2000;

forming a tread molding element by 3D printing from the one or more plastic compositions based on the modelled three-dimensional shape of the tread molding element; and optionally annealing the tread molding element.

According to a second aspect, the disclosure provides for a process for manufacturing a tread molding element configured to mold at least a portion of a tire tread, the process comprising the steps of:

modeling a three-dimensional shape of a tread molding element through a modeling program;

providing one or more plastic compositions comprising one or more thermoplastic polymers selected from one or more polyether ether ketones (PEEK), one or more polyetherimides (PEI) and one or more polyamides, wherein the one or more polyamides are selected from Nylon-6, Nylon-6,6; Nylon-6,9; Nylon-6,10; Nylon-6,12; Nylon-11; Nylon-4,6 and Nylon-66/6 copolymer;

forming a tread molding element by 3D printing from the one or more plastic compositions based on the modelled three-dimensional shape of the tread molding element; and optionally annealing the tread molding element for at least two hours at a temperature of at least 70° C.

The following can be used to further define the process according to the first aspect and the second aspect.

For example, the one or more thermoplastic polymers are selected from one or more polyamides, one or more polyether ether ketones (PEEK) and one or more polyetherimides (PEI).

For example, the one or more thermoplastic polymers are or comprise one or more polyamides.

For example, the one or more polyamides are selected from Nylon-6; Nylon-6,6; Nylon-6,9; Nylon-6,10; Nylon-6,12; Nylon-11; Nylon-4,6 and Nylon-66/6 copolymer. With preference, the one or more polyamides are or comprise Nylon-66/6 copolymer.

For example, the one or more thermoplastic polymers have a melting point of at least 180° C. determined according to ISO 3146:2000; for example, at least 185° C.; for example, at least 190° C.; for example, at least 205° C.; for example, at least 220° C.; for example, at least 230° C.; for example, at least 240° C.

For example, the one or more polyamides have a melting point of at least 180° C. determined according to ISO 3146:2000; for example, at least 185° C.; for example, at least 190° C.; for example, at least 205° C.; for example, at least 220° C.; for example, at least 230° C.; for example, at least 240° C.

For example, at least one plastic composition is a composite comprising one or more thermoplastic polymers and one or more reinforcing materials selected from carbon fibers and glass fibers.

For example, at least one plastic composition is a composite comprising one or more thermoplastic polymers, such as one or more polyamides, and one or more reinforcing materials selected from carbon fibers and glass fibers. The reinforcement material can be provided in a continuous form (filament) or chopped fiber form.

For example, one or more plastic compositions are provided in the form of one or more filaments.

For example, the step of forming a tread molding element by 3D printing from the one or more plastic compositions includes performing the 3D printing by a 3D printer; with preference, the 3D printer is a Fused Filament Fabrication printer. The 3D printers may be of the multiple filaments type. Suitable 3D printer with multiple filaments can be found under the commercial denomination Markforged.

For example, the step of forming a tread molding element by 3D printing from the one or more plastic compositions includes extrusion of the one or more plastic compositions wherein the extrusion temperature is at least 230° C., for example at least 240° C., for example at least 250° C., for example at least 260° C. For example, the step of forming a tread molding element by 3D printing from the one or more plastic compositions includes an extrusion of the one or more plastic compositions wherein the extrusion temperature is ranging from 230 to 400° C.; preferably from 250 to 350° C. or from 260 to 300° C.

For example, the step of forming a tread molding element by 3D printing from the one or more plastic compositions includes depositing layers of the one or more plastic compositions on a heated print bed wherein the print bed temperature is at least 40° C.; for example, at least 50° C.; for example, at least 60° C.

For example, the step of forming a tread molding element by 3D printing from the one or more plastic compositions includes depositing layers of the one or more plastic compositions on a heated print bed wherein the print bed temperature is ranging from 40 to 100° C., preferably from 40 to 80° C. or from 50 to 75° C.; more preferably from 60 to 70° C. or from 60 to 80° C.

For example, the step of forming a tread molding element by 3D printing from the one or more plastic compositions includes forming a tread molding element that comprises a shell and an infill wherein the infill percentage is at least 50 vol. %; preferably at least 60 vol. %; more preferably at least 70 vol. %; for example, at least 75 vol. %; for example, at least 80 vol. %.

For example, the step of forming a tread molding element by 3D printing from the one or more plastic compositions includes forming a tread molding element that comprises a shell and an infill wherein the infill percentage is ranging from 50 to 100 vol. %; for example, from 70 to 90 vol. % or from 80 to 95 vol. %.

For example, the step of forming a tread molding element by 3D printing from the one or more plastic compositions includes forming a tread molding element that comprises a shell and an infill with a fill pattern wherein the shape of the fill pattern is hexagonal.

For example, the step of forming a tread molding element by 3D printing from the one or more plastic compositions includes forming at least one rib or blade by 3D printing from the one or more plastic compositions. For example, the step of forming a tread molding element by 3D printing from the one or more plastic compositions includes forming a plurality of ribs and/or blades by 3D printing from the one or more plastic compositions. For example, the at least one rib or blade or the plurality of ribs and/or blades is arranged to protrude from one face of the tread molding element to form a reverse imprint of a tread pattern.

In an embodiment, the tread molding element comprises a body and at least one rib or blade, and the body is formed of a plastic composition different from the plastic composition used to form at least one rib or blade.

In an embodiment, the tread molding element comprises a shell and an infill and the shell is made of a plastic composition different from the plastic composition used to make the infill.

For example, the step of annealing the tread molding element is performed for a time of at least one hour; for example, at least 1.5 hours, for example at least 2 hours. For example, the step of annealing the tread molding element is performed for a time up to 24 hours; preferably up to 12 hours.

For example, the step of annealing the tread molding element is performed at a temperature of at least 50° C.; for example, at least 60° C.; for example, at least 70° C. For example, the step of annealing the tread molding element is performed at a temperature of at most 100° C.; preferably at most 90° C.; more preferably at most 80° C.

It is preferable to perform the step of annealing the tread molding element when the tread molding element is not kept in a dry environment.

For example, the step of modeling a three-dimensional shape of a tread molding element through a modeling program that can be recognized by a 3D printer includes creating a digital model representing a three-dimensional shape of a tread molding element For example, the step of forming a tread molding element by 3D printing from the one or more plastic compositions includes building the tread molding element from a plurality of layers made from the deposition of a plastic composition wherein the tread molding element is divided into at least two sections, each of the at least two sections being made of different plastic compositions.

For example, the tread molding element is selected from a mold segment, an insert, a prototype of a mold segment and a prototype of an insert.

According to a third aspect, the disclosure provides for the use of one or more plastic compositions in a process for manufacturing a tread molding element configured to mold at least a portion of a tire tread by 3D printing from the one or more plastic composition, wherein the one or more plastic compositions comprise one or more thermoplastic polymers having a melting point of at least 180° C. determined according to ISO 3146:2000. For example, the process is according to the first and/or according to the second aspect.

According to a fourth aspect, the disclosure provides for a tread molding element configured to mold at least a portion of a tire tread, wherein the tread molding element is made of or is comprising one or more plastic compositions, wherein the one or more plastic compositions comprise one or more thermoplastic polymers having a melting point of at least 180° C. determined according to ISO 3146:2000.

For example, the tread molding element is produced from the process according to the first aspect or from the process according to the second aspect. For example, the one or more thermoplastic polymers are selected from one or more polyamides, one or more polyether ether ketones (PEEK) and one or more polyetherimides (PEI).

For example, the one or more polyamides are selected from Nylon-6; Nylon-6,6; Nylon-6,9; Nylon-6,10; Nylon-6,12; Nylon-11; Nylon-4,6 and Nylon-66/6 copolymer. With preference, the one or more polyamides are or comprise Nylon-66/6 copolymer.

Thus, the disclosure provides for a 3D-printed tread molding element configured to mold at least a portion of a tire tread, wherein the tread molding element is made of or is comprising one or more plastic compositions, wherein the one or more plastic compositions comprise one or more thermoplastic polymers having a melting point of at least 180° C. determined according to ISO 3146:2000 and wherein the one or more thermoplastic polymers are selected from one or more polyamides, one or more polyether ether ketones and one or more polyetherimides.

In another definition, the disclosure provides for a 3D-printed tread molding element configured to mold at least a portion of a tire tread, wherein the tread molding element is made of or is comprising one or more plastic compositions, wherein the one or more plastic compositions comprise one or more thermoplastic polymers selected from one or more polyether ether ketones, one or more polyetherimides and one or more polyamides wherein the one or more polyamides are selected from Nylon-6; Nylon-6,6; Nylon-6,9; Nylon-6,10; Nylon-6,12; Nylon-11; Nylon-4,6 and Nylon-66/6 copolymer.

For example, the one or more thermoplastic polymers have a melting point of at least 180° C. determined according to ISO 3146:2000; for example, at least 185° C.; for example, at least 190° C.; for example, at least 205° C.; for example, at least 220° C.; for example, at least 230° C.; for example, at least 240° C.

For example, the one or more polyamides have a melting point of at least 180° C. determined according to ISO 3146:2000; for example, at least 185° C.; for example, at least 190° C.; for example, at least 205° C.; for example, at least 220° C.; for example, at least 230° C.; for example, at least 240° C.

For example, at least one plastic composition is a composite comprising one or more thermoplastic polymers, such as one or more polyamides, and one or more reinforcing materials selected from carbon fibers and glass fibers.

In an embodiment, the tread molding element comprises a body and at least one rib or blade, and the body is formed of a plastic composition different from the plastic composition used to form the blades.

In an embodiment, the tread molding element comprises a shell and an infill and the shell is made of a plastic composition different from the plastic composition used to make the infill.

In an embodiment, the tread molding element comprises a shell and an infill wherein the infill percentage is at least 50 vol. %; preferably, at least 60 vol. %; more preferably at least 70 vol. %; for example, at least 75 vol. %; for example, at least 80 vol. %.

In an embodiment, the tread molding element comprises a shell and an infill wherein the infill percentage is ranging from 50 to 100 vol. %; preferably, from 70 to 100 vol. %; for example, from 70 to 90 vol. % or from 80 to 95 vol. %.

According to a fifth aspect, the disclosure provides for the use of one or more plastic compositions in a tread molding element wherein the one or more plastic compositions comprise one or more thermoplastic polymers having a melting point of at least 180° C. determined according to ISO 3146:2000. With preference, the tread molding element is according to the fourth aspect.

According to a sixth aspect, the disclosure provides for a method for manufacturing a tire or a section of a tire; the method comprising providing one or more tread molding elements made from the process according to the first aspect or to the second aspect and molding a tire or a portion of a tire using the one or more tread molding elements.

For example, molding a tire or a portion of a tire using the one or more tread molding elements comprises providing a green tire or a portion of a green tire and performing vulcanization of the green tire or the portion of a green tire at a temperature of at least 120° C. and for a time of at least 20 minutes in presence of the one or more tread molding elements.

Definitions

The terms "comprising", "comprises" and "comprised of" as used herein are synonymous with "including", "includes", "containing" or "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 includes 1, 2, 3, 4 and 5 when referring to, for example, a number of elements, and can also include 1.5, 2, 2.75 and 3.80, when referring to, for example, measurements). The recitation of endpoints also includes the recited endpoint values themselves (e.g. from 1.0 to 5.0 includes both 1.0 and 5.0). Any numerical range recited herein is intended to include all sub-ranges subsumed therein.

The reference throughout this specification to "one embodiment" or "an embodiment" means that a particular feature, structure or characteristic described in connection with the embodiment is included in at least one embodiment of the present disclosure. The particular features, structures, characteristics or embodiments may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and form different embodiments, as would be understood by those in the art.

Unless otherwise defined, all terms used in the disclosure, including technical and scientific terms, have the meaning as commonly understood by one skilled in the art to which this disclosure belongs. By means of further guidance, definitions for the terms used in the description are included to better appreciate the teaching of the present disclosure.

"Asymmetric tread" means a tread that has a tread pattern not symmetrical about the centre plane or the equatorial plane of the tire.

"Symmetric tread" means a tread that has a tread pattern symmetrical about the centre plane or the equatorial plane of the tire.

"Directional Tread Pattern" means a tread pattern designed for a specific direction of rotation.

"Circumferential" means lines or directions extending along the perimeter of the surface of the annular tread perpendicular to the axial direction.

"Axial" means lines or directions that are parallel to the axis of rotation of the tire.

"Sipes" means small slots molded into the tread elements that subdivide the tread surface and improve traction. A sipe is narrower than a groove.

"Green tire" means a tire in an uncured state; i.e. before a step of vulcanization.

In the disclosure, "3D printing" and "three-dimensional printing" are used as synonymous. In the same way, "3D printer" and "three-dimensional printer" are used as synonymous.

BRIEF DESCRIPTION OF THE DRAWINGS

The invention will be described by way of example and with reference to the accompanying drawings in which.

DETAILED DESCRIPTION OF THE INVENTION

The following is an explanation of a process according to the present disclosure for molding a pneumatic or non-pneumatic tire. The process is also suitable for molding a relevant part of a pneumatic or non-pneumatic tire for testing purposes. The present disclosure is also related to the tread molding element used in the said process and to the pneumatic or non-pneumatic tire or to the parts of a pneumatic or non-pneumatic tire produced according to the said process. The pneumatic or non-pneumatic tire or the parts thereof can show either a symmetric tread, or an asymmetric tread, or a directional tread pattern.

Figure 1:
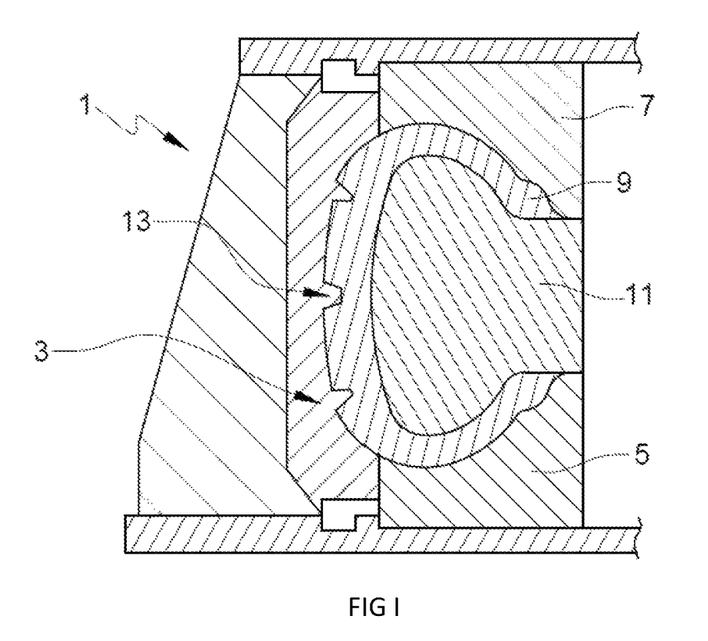
FIG. 1 is a partial cross-sectional view of a tire mold.

Reference is made to FIG. 1 that is a cross-sectional view showing an outline structure of a tire metallic mold 1. The tire mold 1 includes a tread molding section 3 arranged on an outer periphery thereof to mold a tread pattern of a tire, a lower side molding section 5, and an upper side molding section 7 which molds the sides of a tire. A green tire 9 is supported on a rigid core 11 and set in the mold 1 upon closing of the respective molding sections (3, 5, 7) in the state to be subjected to vulcanizing and molding in the mold 1.

Figure 2:
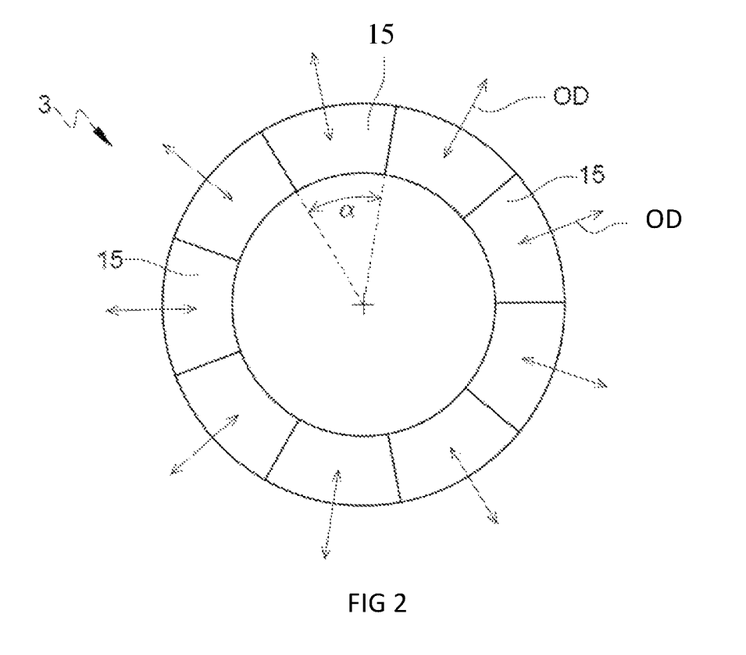
FIG. 2 is a is a view showing a state in which the tread molding section is closed.

FIG. 2 shows the tread molding section 3 for molding of a tire tread divided in a tire circumferential direction into a plurality of mold segments 15. Each mold segment 15 is having an inner face curved along the circumferential direction according to an arc defined by an angle α. The tread molding section 3 may comprise from 4 to 20 mold segments 15; preferably, from 5 to 12 mold segments 15; more preferably, from 6 to 10 mold segments 15; more preferably, from 6 to 9 mold segments 15.

The tread molding section 3 illustrated in FIG. 2 is divided into 9 mold segments 15 which are movable to open and close the tire mold 1 according to an operating direction OD. Each mold segment 15 extends along its length about a portion of the tire's circumference, so each mold segment is having an inner face curved along the circumferential direction.

Each mold segment comprises a body with an inner face that is equipped with a plurality of blades for molding the tread pattern. The blades extend from the inner face into the tire mold. They have one end attached to the inner face (i.e. the proximal end) and one free end (i.e. the distal end). Blades may have any direction depending on the tread pattern that is desired. For example, the mold segments may comprise one or more longitudinal ribs 13 (shown on FIG. 1) to mold circumferential grooves, one or more longitudinal blades to mold circumferential sipes, one or more lateral ribs to mold transversal grooves and one or more lateral blades to mold transversal sipes on a tread surface of the green tire. The transversal grooves or sipes are the ones extending in directions intersecting circumferential grooves and sipes provided on the tread surface. The transversal grooves or sipes can be not necessarily perpendicular to the circumferential grooves or sipes, that is, may extend in directions inclined to the circumferential grooves or sipes. Also, the transversal sipes have a width smaller than the transversal grooves so that the lateral blades are thinner than the lateral ribs.

In an embodiment, the mold segment is one with the body whose inner face is equipped with a plurality of blades and/or ribs for molding the tread pattern. In another embodiment, the mold segment is formed by a support and an insert wherein the body of the insert shows that the inner face is equipped with a plurality of blades and/or ribs for molding the tread pattern.

The disclosure provides for a process for manufacturing a tread molding element configured to mold at least a portion of a tire tread, the process comprising the steps of:

modeling a three-dimensional shape of a tread molding element through a modeling program;

providing one or more plastic compositions comprising one or more thermoplastic polymers having a melting point of at least 180° C. determined according to ISO 3146:2000;

forming a tread molding element by 3D printing from the one or more plastic compositions based on the modelled three-dimensional shape of the tread molding element; and optionally annealing the tread molding element.

According to another definition, the disclosure provides for a process for manufacturing a tread molding element configured to mold at least a portion of a tire tread, the process comprising the steps of:

modeling a three-dimensional shape of a tread molding element through a modeling program that can be recognized by a 3D printer;

providing one or more plastic compositions comprising thermoplastic polymers which are selected from one or more polyether ether ketones, one or more polyetherimides and one or more polyamides; wherein the one or more polyamides are selected from Nylon-6; Nylon-6,6; Nylon-6,9; Nylon-6,10; Nylon-6,12; Nylon-11; Nylon-4,6 and Nylon-66/6 copolymer;

forming a tread molding element by 3D printing from the one or more plastic compositions based on the modelled three-dimensional shape of the tread molding element; and optionally annealing the tread molding element for at least two hours at a temperature of at least 70° C.

Whatever is the definition used, the following applies.

For example, the tread molding element is selected from a mold, a mold segment, an insert, a prototype of a mold segment and a prototype of an insert. For example, the tread molding element is selected from an insert or a prototype of an insert. For example, the tread molding element is selected from a mold segment or a prototype of a mold segment.

For example, a prototype of a mold segment and a prototype of an insert are a representative section of the corresponding mold segment and insert wherein the length according to the circumferential direction of a tire is reduced. For example, the prototype has a length according to the circumferential direction of a tire that is ranging from 10 mm to 500 mm; for example, from 15 mm to 250 mm; for example, from 20 mm to 100 mm; for example, from 25 mm to 50 mm.

3D printing, also known as additive manufacturing, is the process by which a product is built layer by layer using raw material rather than taking material away from a larger stock. The one or more plastic compositions can take many forms; however, it is preferred that the one or more plastic compositions are provided in the form of one or more filaments so that the process is performed using a filament-based 3D printer such as a Fused Filament Fabrication (FFF) printer. FFF printers involve spools of filament fed through a heated extruder and deposited in layers on a print bed which is a flat surface. When ready to begin printing, the filament is unwound from a coil through an extrusion nozzle. The material is then heated until molten and laid down on the print bed by the extruder, in a shape controlled via computer and 3D modeling software. As the material exits the extruder nozzle, it fuses to itself and hardens. This process is repeated, building the product up layer by layer until the tread molding element has been fully realized.

In an embodiment, the step of modeling a three-dimensional shape of a tread molding element through a modeling program that can be recognized by a 3D printer includes creating a digital model representing a three-dimensional shape of a tread molding element. For example, the three-dimensional shape of a tread molding element at least partially defining a molding cavity for forming a corresponding tire tread pattern. For example, the digital model is created from the modeling program. In performing this step, it is understood that a digital model is created to represent a three-dimensional structure comprising a molding member for use in molding a physical tire or a section of a tire. The molding member has a cavity with a reverse imprint of a tread pattern The modeling program is a three-dimensional modeling program. Such programs are known to the person skilled in the art and are commercially available. Examples of suitable modeling programs include but are not limited to AutoCAD, 3D Max, SolidWorks, CATIA, SketchUp, Maya, Inventor, and Pro Engineer. For example, the modeling program is CATIA. The terms "CATIA" and "Computer Aided Three-Dimensional Interactive Application" as used herein refer to program forming a multi-platform CAD/CAM/CAE commercial software suite. It was developed by Dassault Systèmes (Vélizy-Villacoublay, France), and is commercially available from sources known by those having ordinary skill in the art, such as IBM Corporation (Armonk, N.Y).

The three-dimensional modeling program is used to model the three-dimensional shape of the object, convert it to an STL file (i.e. "Standard Triangle Language" file).

Filament-based 3D printers, such as FFF printers, are known to the person skilled in the art and commercially available. The FFF printers comprise an extruder and a hotend. The extruder is driving the filament through the 3D printing system and is responsible for controlling the material feed into the hotend. The extruder typically comprises a stepper motor that activates gears, which in turn grip the filament and push it through the hotend and onto the print bed. The hotend is the component of a 3D printer that melts the filament for extrusion and helps to maintain a consistent and accurate temperature for successful prints. The hotend is responsible for melting and depositing material. The hotend typically comprises a guiding tube for the filament, a heating element, and a brass nozzle. The extruder will drive the filament through the hotend where it will be heated until molten and then further extruded through the nozzle and onto the print bed. Once heated, the nozzle also serves to decrease the filament diameter from the initial 1.75 or 3.00 mm to a diameter that may range from 0.2 to 0.4 mm, depending on the nozzle. For example, the initial filament diameter is 1.75 mm.

According to the disclosure the tread molding element is formed by 3D printing from a plastic composition comprising one or more thermoplastic polymers selected from one or more polyamides, one or more polyether ether ketones and one or more polyetherimides.

For example, the one or more thermoplastic polymers are selected to have a melting point of at least 190° C. determined according to ISO 3146:2000; preferably of at least 205° C., more preferably of at least 220° C., even more preferably of at least 230° C. or at least 240° C. Thus, the one or more polyamides are selected to have a melting point of at least 190° C.; preferably of at least 205° C., more preferably of at least 220° C., even more preferably of at least 230° C. or at least 240° C.

With preference, the one or more thermoplastic polymers are selected to have a melting point of at most 400° C.; preferably of at most 380° C.

For example, the one or more thermoplastic polymers are or comprise one or more polyether ether ketones. The Polyether ether ketone (PEEK) is having a melting point of about 343° C. The melting point is determined according to ISO 3146:2000.

For example, the one or more thermoplastic polymers are or comprise one or more polyetherimides (CAS 61128-46-9). The polyetherimide (PEI) is having a melting point ranging from 340 to 360° C. The melting point is determined according to ISO 3146:2000. Non-limiting example suitable PEI filaments that can be used in the context of the disclosure are commercially available under the denomination of ULTEM™ FILAMENT.

For example, the one or more thermoplastic polymers are or comprise one or more polyamides wherein the one or more polyamides are selected from Nylon-6; Nylon-6,6; Nylon-6,9; Nylon-6,10; Nylon-6,12; Nylon-11; Nylon-4,6 and Nylon-66/6 copolymer. With preference, the one or more polyamides are or comprise Nylon-66/6 copolymer.

Nylon-6 (also known as polycaprolactam or as poly (azepan-2-one); poly(hexano-6-lactam)) has a melting point of about 225° C. Nylon-6,6 (also known as hexamethylene adipamide) has a melting point of about 265° C. Nylon-6,9 (also known as hexamethylene azelamide) has a melting point of about 208° C. Nylon-6,10 (also known as hexamethylene sebacamide) has a melting point of about 227° C. Nylon-6,12 (also known as hexamethylene dodecane-diamide) has a melting point of about 218° C. Nylon-11 (also known as ω-undecanamide) has a melting point of about 189° C. Nylon-4,6 (also known as tetramethylene adipamide) has a melting point of 290° C. Nylon-66/6 copolymer (i.e. a copolyamide made from PA 6 and PA 66) has a melting point of about 243° C. The melting point is determined according to ISO 3146:2000.

For example, the thermoplastic polymer filament is having a tensile strength (X-Y orientation in a dry state) ranging from 30.0 to 300.0 MPa as determined according to ISO 527; preferably ranging from 40.0 to 200.0 MPa; more preferably ranging to 50.0 to 100.0 MPa. The dry state means that the specimens are annealed at 80° C. for 30 min and dried 48 h before testing.

For example, the thermoplastic polymer filament is having an elongation at break (X-Y orientation in a dry state) ranging from 5.0 to 60.0% as determined according to ISO 527; preferably ranging from 7.0 to 50.0%; more preferably ranging from 8.5 to 20.0%. The dry state means that the specimens are annealed at 80° C. for 30 min and dried 48 h before testing.

For example, the thermoplastic polymer filament is having a Charpy impact strength at 23° C. (X-Y orientation in a dry state) ranging from 3.0 to 40.0 kJ/m2 as determined according to ISO 179; preferably, ranging from 5.0 to 35.0 kJ/m2; more preferably ranging from 7.0 to 30.0 kJ/m2. Non-limiting examples of suitable nylon filament that can be used in the context of the disclosure are commercially available under the denomination PolyMide™ CoPA which shows a tensile strength (X-Y orientation in a dry state) of 66.2+/−0.9 MPa as determined according to ISO 527; elongation at break (X-Y orientation in a dry state) of 9.9+/−1.5%; Charpy impact strength at 23° C. (X-Y orientation in a dry state) of 9.6+/−1.4 kJ/m2. In an embodiment, at least one plastic composition is a composite comprising the one or more thermoplastic polymers and one or more reinforcing materials such as one or more selected from carbon fibers and glass fibers; with preference, with carbon fibers. Non-limiting examples of suitable reinforced nylon filaments that can be used in the context of the disclosure are commercially available under the denomination nylon carbonite. Non-limiting examples of suitable reinforced PEEK filaments that can be used in the context of the disclosure are commercially available under the denomination of CarbonX™ CF-PEEK. When reinforced filaments are used, the person skilled in the art will have an advantage to use a nozzle that is resistant to abrasive material. An example of such nozzles is commercially available under the commercial denomination Olsson Ruby.

For example, the step of forming a tread molding element by 3D printing from the one or more plastic compositions includes building the tread molding element from a plurality of layers made from the deposition of a plastic composition wherein the tread molding element is divided into at least two sections, each of the at least two sections being made of different plastic compositions.

For example, the step of forming a tread molding element by 3D printing from the one or more plastic compositions includes forming at least one rib or blade by 3D printing from the one or more plastic compositions.

Figure 3:
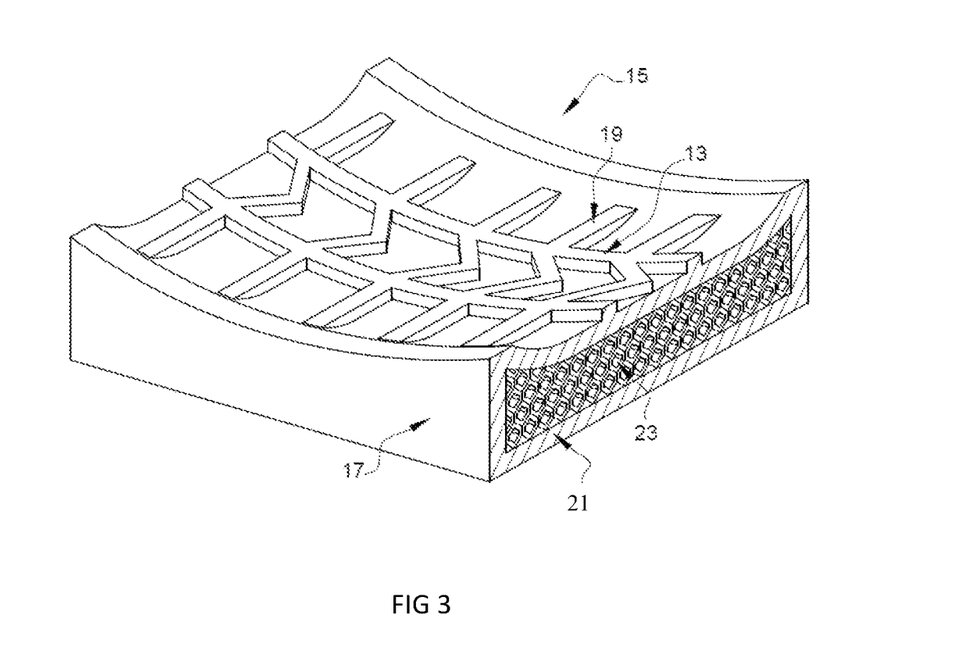
FIG. 3 is a view showing an example of a tread molding element according to the disclosure.

FIG. 3 is illustrating a tread molding element being a mold segment 15 according to the disclosure. The tread molding element 15 comprises a body 17 and at least one rib or blade (13, 19) and the one or more plastic compositions used to form the body 17 can be the same or different from the one or more plastic compositions used to form at least one rib or blade (13, 19). For example, both the body 17 and at least one rib or blade (13, 19) are formed from the same plastic composition. For example, the body 17 comprises a shell 21 and an infill 23, and the shell 21 and at least one rib or blade (13, 19) are formed from the same plastic composition whereas the infill 23 is formed from a different plastic composition. For example, the entire tread molding element 15 is formed from a single plastic composition.

For example, the tread molding element 15 comprises a body 17 and at least one rib or blade (13, 19), and the body 17 is formed from a plastic composition different from the one or more plastic compositions used to form at least one rib or blade (13, 19). For example, one or more plastic compositions used to form at least one rib or blade (13, 19) is a composite comprising the one or more thermoplastic polymers and one or more reinforcing materials such as one or more of carbon fibers and glass fibers; with preference carbon fibers.

For example, the tread molding element comprises a shell 21 and an infill 23 and the shell 21 is made of a plastic composition different from the one or more plastic compositions used to make the infill 23. For example, one or more plastic compositions used to form the shell 21 are a composite comprising the one or more thermoplastic polymers and one or more reinforcing materials such as one or more selected from carbon fibers and glass fibers; with preference carbon fibers.

In an embodiment, one or more plastic compositions used to form the infill 23 are a composite comprising the one or more thermoplastic polymers and one or more reinforcing materials such as one or more selected from carbon fibers and glass fibers; with preference, carbon fibers.

Nylon is hygroscopic and therefore may absorb moisture from the air. Moisture in a nylon filament may turn to steam as it enters the nozzle of the printer, and can cause gaps in the flow or create back-pressure or swelling of the filament, increasing the risk of jamming. Therefore, the person skilled in the art would have the advantage to keep the relative humidity or moisture below 15%. To this effect, a step of drying the one or more plastic compositions can be performed before forming a tread molding element by 3D printing from the one or more plastic compositions. The drying step can be performed using a filament dryer. For example, the drying step is performed by airflow at a temperature ranging from 35 to 70° C. The filament can be kept dry by the use of a dry box, for example.

The print surface is preferably cleaned before use, for example using acetone or isopropyl alcohol to remove all grease and residue from the print bed.

It is preferable to heat the print bed of the 3D printer to reduce shrinking and separation of the tread molding element from the print bed. For example, the print bed temperature is ranging from 40 to 80° C., preferably from 50 to 75° C., more preferably from 60 to 70° C., or from 60 to 80° C.

It is preferable to use an adhesive to bond the tread molding element to the print bed. A suitable adhesive that can be used in the context of the disclosure is a Nano Polymer Adhesive such as the one commercially available from Vision Miner.

The extrusion temperature of the one or more plastic compositions (i.e. of the filament of plastic composition) is selected to promote the adhesion of the first layer. For example, the extrusion temperature is at least 230° C.; for example, at least 240° C.; for example, at least 250° C.; for example, at least 260° C. The extrusion temperature is at most 400° C.; for example, at most 350° C. For example, the extrusion temperature is ranging from 250° C. to 300° C. Increasing the print temperature can improve the adhesion of the first layer. However, when the extrusion temperature is too high, the filament will continue to melt and leak from the nozzle causing threads and burrs. On the contrary, when the extrusion temperature is set too low, this may cause gaps or separation between the layers. Suitable hotends that can be used for extrusion temperatures of up to 400° C. are available under the commercial name Dragon All Metal Hotend.

It is preferred that the tread molding element can be solid or can have two distinct zones, i.e. a shell 21 and an internal part 23 (also named infill). The shell 21 forms the outer walls of the tread molding element 15 in which both the layers in contact with the printing base and the top layers that attribute the final surface finish are included. For example, the tread molding element comprises a shell 21 and an infill 23 wherein the shell includes an inner face and one or more ribs or one or more blades that are arranged to protrude from the inner face of the tread molding element 15 to form a reverse imprint of a tread pattern. The reverse imprint can be used in a process for manufacturing a tire or a section of a tire to cut the surface of a green tire, or of a section of the green tire, according to the desired tread pattern.

The amount of material that occupies the internal part of the shell is called the infill percentage. Said infill percentage can be adjusted from a suitable program that will drive the 3D printer. Suitable programs such as rolling programs are known by the person skilled in the art and are commercially available.

The infill 23 percentage can range from 0 vol. % (i.e. hollow part) to 100 vol. % (i.e. totally solid part. The use of a shell and infill form allows a good compromise between rigidity and costs. Since the tread molding element should be sufficiently rigid to withstand the molding pressures, the person skilled in the art will find an advantage to use an infill percentage of at least 50 vol. %; preferably at last 60 vol. %; more preferably at least 70 vol. %, for example at least 75 vol. %; for example, at least 80 vol. %. The infill can be at most 95 vol. %, for example at most 90 vol. %. For example, the infill is ranging from 50 to 100 vol. %; preferably from 70 to 100 vol. %; for example, from 70 to 90 vol. %, or from 80 to 95 vol. %. Increasing the infill will increase the rigidity of the tread molding element but also the print time and the amount of the one or more plastic compositions used to print the tread molding element. In case reinforcing elements are used, the infill percentage may be as low as 50 vol. %. In case no reinforcing elements are used the person skilled in the art will have advantage to increase the infill percentage to at least 70 vol. %.

The infill can show fill pattern of any shape such as rectangular, triangular, hexagonal, or tri-hexagonal (i.e. hexagons interspersed with triangles). It is preferred that the shape of the fill pattern is hexagonal to offer to the tread molding element a great resistance in all directions. In FIG. 3, the infill 23 pattern is hexagonal. The fill pattern structure can be in 2D or 3D.

Once the tread molding element is printed, it is preferably kept dry to keep the mechanical properties, in particular when the thermoplastic polymer is one or more polyamides.

The disclosure also provides for a method for manufacturing a tire or a section of a tire; the method comprising providing one or more tread molding elements made from the process of the present disclosure and molding a tire or a portion of a tire using the one or more tread molding elements. With preference, molding a tire or a portion of a tire using the one or more tread molding elements comprises providing a green tire or a portion of a green tire and performing vulcanization of the green tire or the portion of a green tire at a temperature of at least 120° C. and for a time of at least 20 minutes in presence of the one or more tread molding elements. Example.

Figure 4:
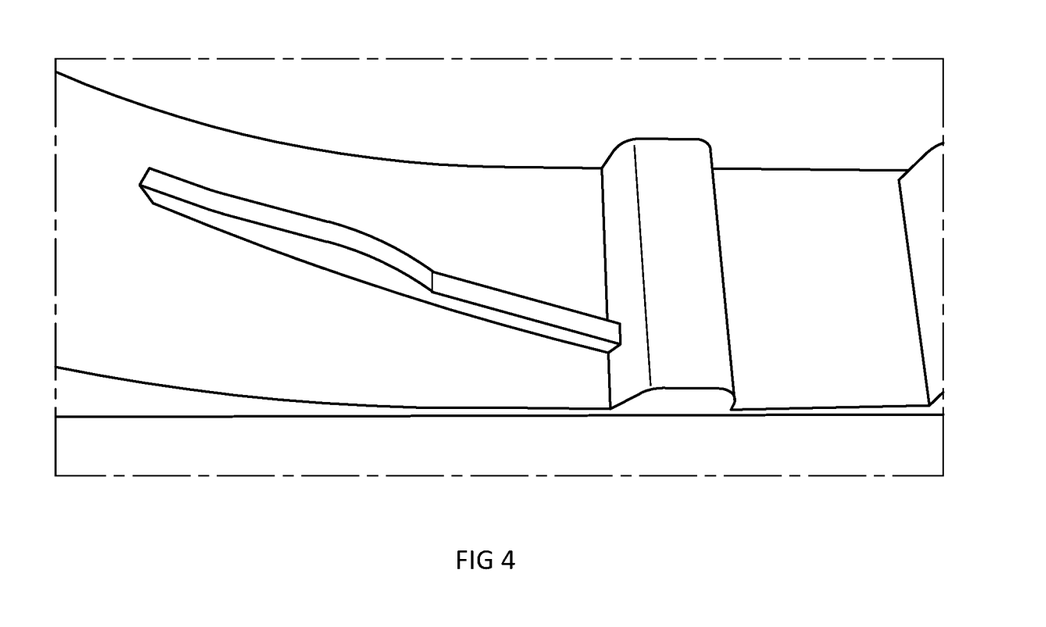
FIG. 4 is a picture of an example of a tread molding element produced according to the process of the disclosure.

A tread molding element was manufactured by 3D printing using PolyMide™ CoPA filament of a diameter size 1.75 mm (i.e. a filament of polyamide) and is shown in FIG. 4. The extrusion temperature was between 260 and 270° C., and the bed temperature was between 60 and 70° C.

A portion of a tire was successfully molded using the tread molding element.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for manufacturing a tread molding element configured to mold at least a portion of a tire tread, the process comprising the steps of:
   modeling a three-dimensional shape of the tread molding element through a modeling program;
   providing one or more plastic compositions comprising one or more thermoplastic polymers having a melting point of at least 180° C. determined according to ISO 3146: 2000;
   forming the tread molding element by 3D printing from the one or more plastic compositions based on the modelled three-dimensional shape of the tread molding element; and
   optionally annealing the tread molding element.

2. The process according to claim 1, wherein the one or more thermoplastic polymers are selected from one or more polyamides, one or more polyether ether ketones and one or more polyetherimides.

3. The process according to claim 1, wherein the one or more thermoplastic polymers are one or more polyamides selected from Nylon-6; Nylon-6,6; Nylon-6,9; Nylon-6,10; Nylon-6,12; Nylon-11; Nylon-4,6 and Nylon-66/6 copolymer.

4. The process according to claim 1, wherein the one or more thermoplastic polymers are or comprise Nylon-66/6 copolymer.

5. The process according to claim 1, wherein the one or more thermoplastic polymers have the melting point of at least 220° C. determined according to ISO 3146: 2000.

6. The process according to claim 1, wherein one or more is true:
   the one or more plastic compositions is a composite comprising the one or more thermoplastic polymers and one or more reinforcing materials selected from carbon fibers and glass fibers;
   the one or more plastic compositions are provided in a form of one or more filaments.

7. The process according to claim 1, wherein the step of forming the tread molding element by the 3D printing from the one or more plastic compositions includes one or more of the following:

performing the 3D printing with a 3D printer which is a Fused Filament Fabrication printer;

extruding the one or more plastic compositions wherein an extrusion temperature is ranging from 250 to 400° C.;

depositing layers of the one or more plastic compositions on a heated print bed wherein a print bed temperature is ranging between 60 and 100° C.

8. The process according to claim 1, wherein the step of forming the tread molding element by the 3D printing from the one or more plastic compositions includes forming the tread molding element to comprise a shell and an infill having a volume wherein the volume of the infill is filled by an infill percentage ranging from 50 to 100 vol.%.

9. The process according to claim 1, wherein the step of forming the tread molding element by the 3D printing from the one or more plastic compositions includes forming at least one rib or blade by the 3D printing from the one or more plastic compositions.

10. The process according to claim 9, wherein the tread molding element comprises a body and the at least one rib or blade, and the body is formed from a plastic composition among the one or more plastic compositions different from a plastic composition used to form the at least one rib or blade among the one or more plastic compositions.

11. The process according to claim 9, wherein the tread molding element comprises a shell and an infill, and the one or more the shell is formed from is different from the plastic composition one or more plastic compositions the infill is formed from.

12. The process according to claim 1, wherein in the step of annealing the tread molding element, one or more is true:
the step of annealing the tread molding element is performed for a time of at least one hour;
the step of annealing the tread molding element is performed at a temperature of at least 50° C.

13. The process according to claim 1, wherein the step of modeling the three-dimensional shape of the tread molding element through the modeling program includes creating a digital model representing the three-dimensional shape of the tread molding element.

14. The process according to claim 1, wherein the step of forming the tread molding element by the 3D printing from the one or more plastic compositions includes building the tread molding element from a plurality of layers made from a deposition of the one or more plastic compositions wherein the tread molding element is divided into at least two sections, each of the at least two sections being made of the one or more plastic compositions that are different from each other.

15. A process for manufacturing a tread molding element configured to mold at least a portion of a tire tread, the process comprising the steps of:
modeling a three-dimensional shape of the tread molding element through a modeling program;
providing one or more plastic compositions comprising one or more thermoplastic polymers selected from one or more polyether ether ketones, one or more polyetherimides, and one or more polyamides, wherein the one or more polyamides are selected from Nylon-6; Nylon-6,6; Nylon-6,9; Nylon-6,10; Nylon-6,12; Nylon-11; Nylon-4,6 and Nylon-66/6 copolymer;
forming the tread molding element by 3D printing from the one or more plastic compositions based on the modelled three-dimensional shape of the tread molding element; and
optionally annealing the tread molding element for at least two hours at a temperature of at least 70° C.

16. The process according to claim 15, wherein the step of forming the tread molding element by the 3D printing from the one or more plastic compositions includes one or more of the following:
performing the 3D printing with a 3D printer which is a Fused Filament Fabrication printer;
extruding the one or more plastic compositions wherein an extrusion temperature is at least 260° C.;
depositing layers of the one or more plastic compositions on a heated print bed wherein a print bed temperature is at least 60° C.

17. The process according to claim 15, wherein the step of forming the tread molding element by the 3D printing from the one or more plastic compositions includes forming the tread molding element that comprises a shell and an infill having a volume wherein the volume of the infill is filled by an infill percentage of at least 80 vol. %.

18. The process according to claim 15, wherein the tread molding element is selected from a mold segment, an insert, a prototype of the mold segment and a prototype of the insert.

* * * * *